United States Patent
Myers et al.

(10) Patent No.: US 10,444,763 B2
(45) Date of Patent: Oct. 15, 2019

(54) SYSTEMS, METHODS, AND DEVICES FOR FUSION OF PREDICTED PATH ATTRIBUTES AND DRIVE HISTORY

(71) Applicant: Ford Global Technologies, LLC, Dearborn, MI (US)

(72) Inventors: Scott Vincent Myers, Camarillo, CA (US); Shane Elwart, Ypsilanti, MI (US); David A Herman, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 509 days.

(21) Appl. No.: 15/076,120

(22) Filed: Mar. 21, 2016

(65) Prior Publication Data

US 2017/0269605 A1     Sep. 21, 2017

(51) Int. Cl.

| | |
|---|---|
| *G05D 1/02* | (2006.01) |
| *B60R 16/023* | (2006.01) |
| *B60W 30/14* | (2006.01) |
| *G05B 13/02* | (2006.01) |
| *H04L 29/08* | (2006.01) |
| *B60W 50/00* | (2006.01) |
| *B60W 50/14* | (2012.01) |
| *G01C 21/36* | (2006.01) |

(52) U.S. Cl.
CPC ....... *G05D 1/0274* (2013.01); *B60R 16/0231* (2013.01); *B60W 30/14* (2013.01); *B60W 30/143* (2013.01); *B60W 50/0097* (2013.01); *B60W 50/14* (2013.01); *G01C 21/3617* (2013.01); *G05B 13/021* (2013.01); *G05D 1/0212* (2013.01); *H04L 67/12* (2013.01); *B60W 2050/0088* (2013.01); *B60W 2050/0089* (2013.01); *B60W 2550/143* (2013.01); *B60W 2550/402* (2013.01)

(58) Field of Classification Search
None
See application file for complete search history.

(56) References Cited

U.S. PATENT DOCUMENTS

| | | | |
|---|---|---|---|
| 6,028,550 A * | 2/2000 | Froeberg | G01C 21/28 342/357.29 |
| 6,735,515 B2 | 5/2004 | Bechtolsheim | |
| 7,356,392 B2 | 4/2008 | Hubbard | |
| 8,712,691 B2 | 4/2014 | Joh | |
| 9,079,587 B1 | 7/2015 | Rupp | |
| 9,189,958 B2 | 11/2015 | Gee | |

(Continued)

FOREIGN PATENT DOCUMENTS

| | | |
|---|---|---|
| CN | 102364304 A | 2/2012 |
| CN | 102915404 B * | 7/2015 |

*Primary Examiner* — Shelley Chen
(74) *Attorney, Agent, or Firm* — David R. Stevens; Stevens Law Group

(57) ABSTRACT

A method for providing path attributes to controllers in a vehicle includes determining a most probable path for a vehicle. The method includes obtaining attributed predicted path attributes based on a map and obtaining drive history path attributes based on a drive history. The method further includes generating combined path attributes based on the path attributes from the attributed predicted path and the path attributes from the drive history. The method also includes providing the combined path attributes to one or more controllers.

20 Claims, 5 Drawing Sheets

(56) References Cited

U.S. PATENT DOCUMENTS

| | | | |
|---|---|---|---|
| 2002/0026278 A1* | 2/2002 | Feldman | G08G 1/0104 |
| | | | 701/117 |
| 2005/0091176 A1* | 4/2005 | Nishiuma | G06Q 10/04 |
| | | | 706/45 |
| 2012/0232733 A1 | 9/2012 | Herbin | |
| 2012/0271544 A1 | 10/2012 | Hein | |
| 2013/0158794 A1 | 6/2013 | Wilson | |
| 2013/0158871 A1* | 6/2013 | Joh | B60W 40/072 |
| | | | 701/532 |
| 2014/0249716 A1 | 9/2014 | Dorum | |
| 2015/0019122 A1 | 1/2015 | Wang | |
| 2015/0153197 A1 | 6/2015 | Denaro | |
| 2015/0275787 A1* | 10/2015 | Dufford | F02D 29/02 |
| | | | 701/102 |
| 2017/0018192 A1* | 1/2017 | Borgyos | G08G 5/0039 |
| 2017/0131406 A1* | 5/2017 | Li | G01C 21/20 |
| 2017/0208540 A1* | 7/2017 | Egner | H04W 4/029 |
| 2017/0272972 A1* | 9/2017 | Egner | H04W 28/0268 |
| 2018/0112992 A1* | 4/2018 | Akaho | G01C 21/26 |

* cited by examiner

SYSTEMS, METHODS, AND DEVICES FOR FUSION OF PREDICTED PATH ATTRIBUTES AND DRIVE HISTORY

TECHNICAL FIELD

The disclosure relates generally to methods, systems, and apparatuses for fusion of attributed predicted path and drive history information.

BACKGROUND

Automobiles provide a significant portion of transportation for commercial, government, and private entities. Due to the high value of automobiles and potential harm to passengers and drivers, driver safety and avoidance of collisions, accidents, or other damage to vehicles are extremely important. In order to have more detailed information about a section of roadway or other driving environment, some vehicles may store drive histories which include detailed information gathered by sensors for later recall when traversing the same roadways.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
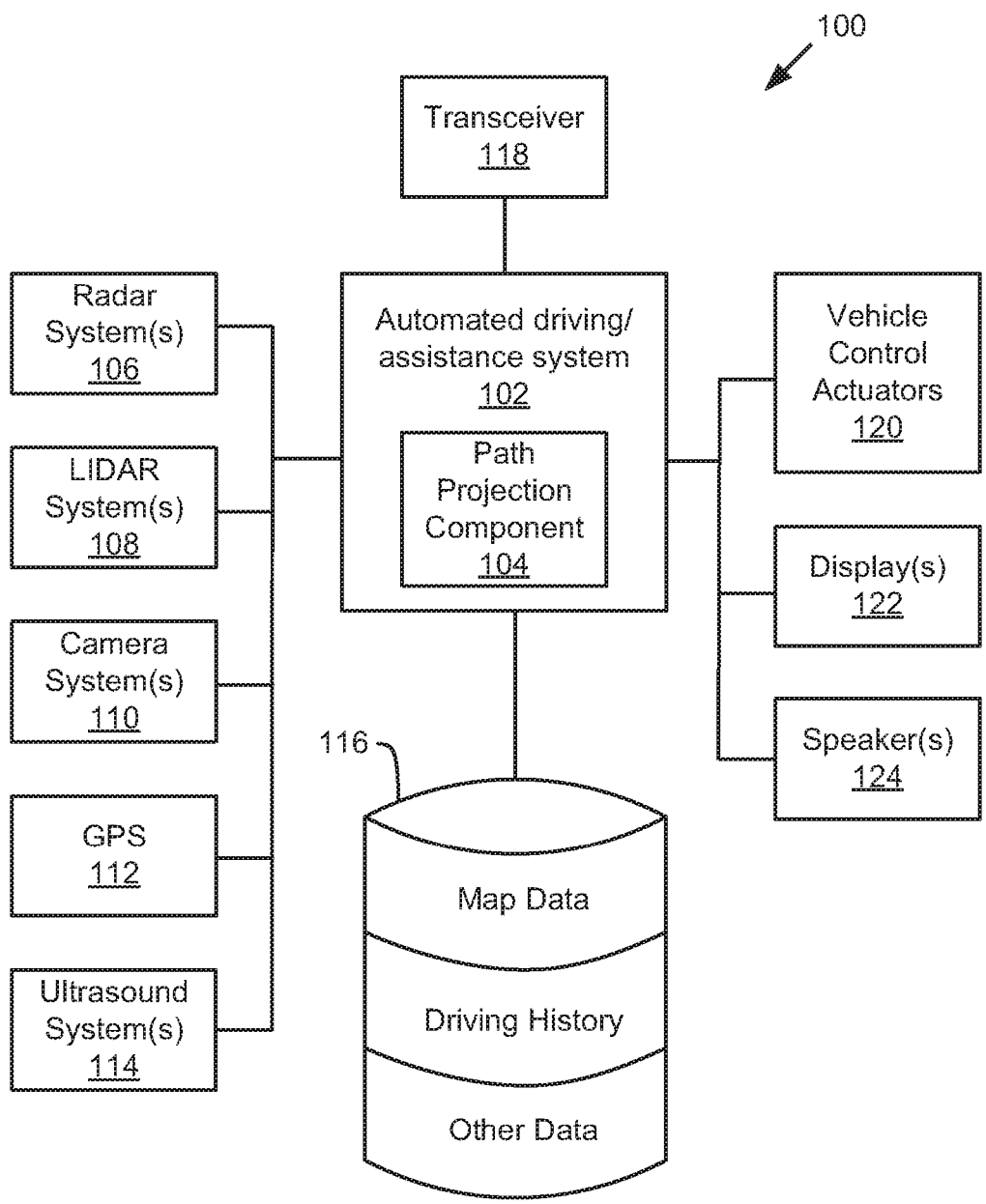
FIG. 1 is a schematic block diagram illustrating an implementation of a vehicle control system that includes an automated driving/assistance system.

Attributed predicted paths for vehicles provide information about a roadway or a driving path ahead of a vehicle based on electronic map data. For example, attributed predicted paths may be able to provide information about road curvature, tilt of a roadway, or a plurality of other details. This information may be used by a human driver or an automated driving system to safely, efficiently, and accurately drive the car along a desired path. The Advanced Driver Assistance Systems Interface Specification (ADASIS) provides standards for attributed predicted path provider operation to allow interconnection of driver assistance systems (or automated driving systems) from different providers or companies. The different components, may then be able to communicate with each other over a controller area network (CAN) bus. For example, sensors or data sources may publish data to the CAN bus while controllers of various systems may be able to access that data for processing in controlling the vehicle and/or providing assistance to a human driver.

However, attributed predicted path information (or data available in a map) from an attributed predicted path provider (such as an ADASIS Horizon provider) may be limited in the amount of detail that is available. In some cases, additional detail may be available in a drive history for paths previously traveled by a driver or vehicle. However, current methods of providing drive history are inefficient and increase complexity for controllers accessing the data. For example, both attributed predicted path providers and drive history may project (e.g., provide) path attributes for a route or path ahead of the vehicle. However, providing these separately requires extra work by controllers to resolve any differences between the attributed predicted path data and/or the drive history data. Additionally, even if the two sources do not provide conflicting information, the controller may still be required to reconstruct and/or fuse the data. For example, reconstructors (such as controllers listening to a CAN bus) may be required to individually fuse the data, which is inefficient and error prone.

Applicant has recognized that considerable resource savings can be achieved by fusing attributed predicted path data and drive history data before providing path attributes to controllers. In one embodiment, a central controller in communication with a CAN bus fuses data from different sources together to provide a coherent view of the path ahead of the vehicle. For example, fusing may be performed using a co-located attributed predicted path/drive history source (both sourced from the same controller). As another example, a drive history controller may reconstruct the attributed predicted path attributes and fuse them with drive history path attributes. The fused attributes may be projected to controllers via a bus or an attributed predicted path provider or a drive history provider.

Applicant has developed systems, methods, and devices for providing path attributes to a vehicle control system and/or individual controllers of a vehicle. According to one embodiment, a method for providing path attributes includes determining a most probable path for a vehicle. The method also includes obtaining attributed predicted path attributes based on a map and obtaining drive history path attributes based on a drive history. The method includes generating combined path attributes based on the path attributes from the attributed predicted path and the path attributes from the drive history. The method includes providing the combined path attributes to one or more controllers.

In one embodiment, fused path attributes may be provided to controllers over a controller bus (such as a CAN bus). In one embodiment, Applicant proposes modifications of or additions to the ADASIS standard to include a common protocol allowing fused path attributes (based on attributed predicted path data and/or drive history data) to be broadcast to all other controllers on the bus. In one embodiment, each reconstructor (such as a controller listening on the bus) would recreate a small subset of the path database for specific uses, needs or applications of the controller. For example, the controllers may use or implement a myriad of applications and may include, but are not limited to, an adaptive cruise control, an energy management controller, a curve warning controller, a headlight controller, a lane departure warning system, a hill power train optimization controller, a driver notification system, an automated driving system, and/or a driver assistance system. An adaptive cruise may adapt a controlled speed of the vehicle based on traffic, road geometry or other environmental factors. An energy management controller may manage speed or vehicle accessory systems (such as heating or cooling) based on predicted incline, decline, or the like of a roadway. A curve warning controller may control a notification system to warn of the presence, severity, or curvature of one or more upcoming turns or curves in a roadway. A headlight controller may control a direction of light cast by a headlight to cover the roadway even when the roadway is curvy. A lane departure warning system may give a warning when the vehicle departs from a lane on the roadway. A hill power train optimization controller may control a power train, including a gear and/or rotation speed of a motor or engine to optimize power usage. A driver notification system may provide notifications to a driver of a suggested speed for a current roadway, curve, or a vehicle maneuver.

In one embodiment, a system may learn new routes as well as route attributes while a vehicle is being driven. For example, as a driver drives a vehicle to a destination, sensors of the system may log route attributes or other detailed information about the route which may be recalled later. When the same route is being traveled again, the vehicle or system may recognize that this route has been traveled before and pull up the route attributes or other detailed information to help with navigation or any other driver assistance or automated driving task.

In one embodiment, the recalled path attributes may be used to construct and project a forward path. For example, the details of the forward path may be assembled into a matrix or other representation of the path in front of the vehicle to allow a driver or other system to anticipate features or attributes of the road or path ahead. The matrix may be first populated with drive history data and then filled-in with data from an attributed predicted path provider, ADASIS Horizon provider, or an electronic map to create fused path attributes. The amount of the path to project may be based on a current speed of the vehicle or a current speed limit for the roadway on which a vehicle is being driven. As the vehicle moves along the path, additional path attributes may be provided (e.g., over a CAN bus) so that there is always some information about the pathway ahead. In one embodiment, a system may re-project the forward path when the previous projection has been nearly traversed.

If a vehicle does not follow the projected path or a predicted driving route, a system may flush or discard the published path attributes. For example, if a vehicle turns off the predicted path the fused path attributes may not apply to the new route and may be discarded using CAN bus messages similar to those described in the ADASIS protocol. If available, fused path attributes for the new path may be determined and projected upon transition to the new path. If the path is unknown or does not have correlated information in a drive history, the forward path may be projected as well as possible with data from an electronic map or attributed predicted path provider.

Referring now to the figures, FIG. 1 illustrates an example vehicle control system 100 that may be used for assisting a human driver or performing automated driving. The vehicle control system 100 may comprise an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. For example, the automated driving/assistance system 102 may include one or more controllers (such as those discussed herein) that provide or receive data over a controller bus and use the data to determine actions to be performed and/or provide instructions or signals to initiate those actions. The automated driving/assistance system 102 may include a path projection component 104 that provides fused information from different sources about path attributes to a human driver, a driving control systems, or other controllers that control any aspect of automated driving or driver assistance.

The vehicle control system 100 also includes one or more sensor systems/devices for detecting a presence of nearby objects, lane markers, and/or or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The vehicle control system 100 may include a data store 116 for storing relevant or useful data for navigation and safety such as map data, a driving history (i.e., drive history), or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. The speakers 124 may include one or more speakers of a sound system of a vehicle or may include a speaker dedicated to driver notification. The vehicle control actuators 120, displays 122, speakers 124, or other parts of the vehicle control system 100 may be controlled by one or more of the controllers of the automated driving/assistance system 102.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. The automated driving/assistance system 102 may implement one or more algorithms, applications, programs, or functionality that drive or assist in driving of the vehicle.

In one embodiment, the camera systems 110 may include a plurality of cameras. For example, the camera systems 110 may include cameras facing in different directions to provide different views and different fields of view for areas near or around the vehicle. For example, some cameras may face forward, sideward, rearward, at angles, or in any other direction.

Figure 2:
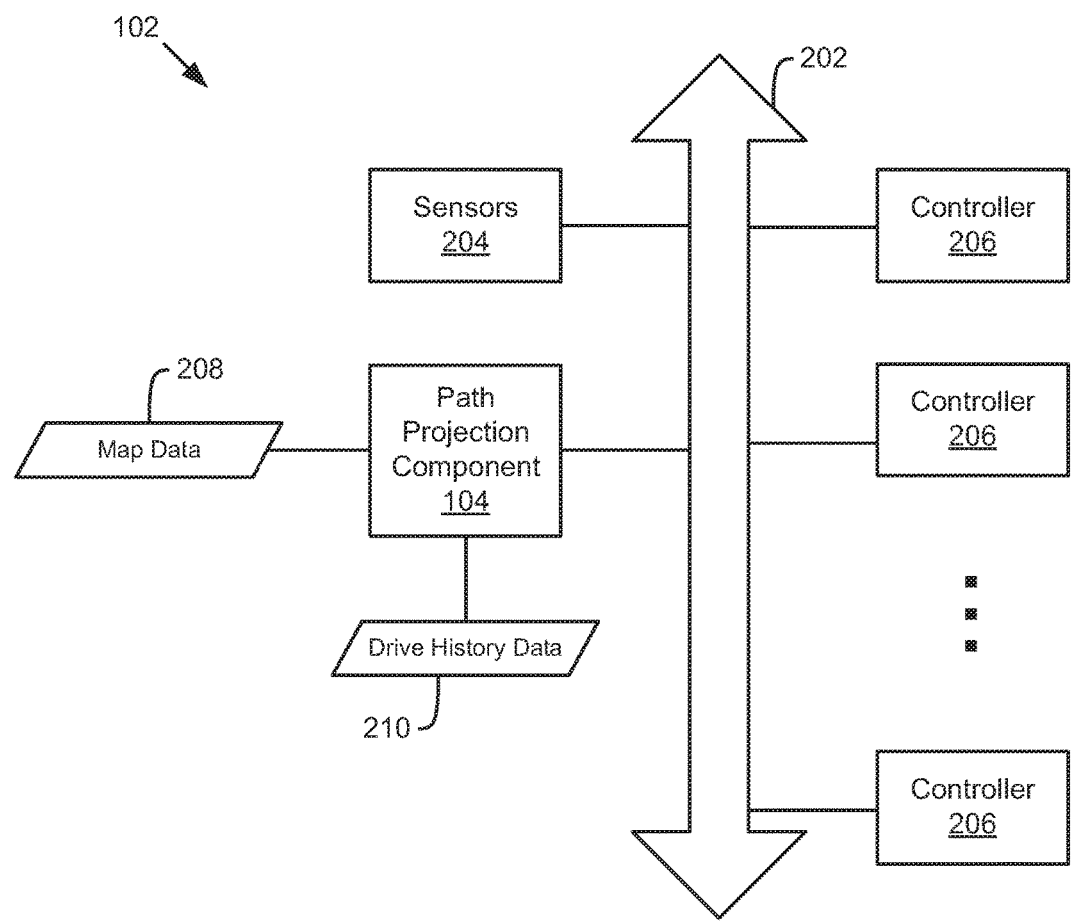
FIG. 2 is a schematic block diagram illustrating an automated driving/assistance system, according to one implementation.

FIG. 2 is a schematic block diagram illustrating an automated driving/assistance system 102. The automated driving/assistance system 102 includes a controller bus 202, one or more sensors 204, a plurality of controllers 206, and a path projection component 104. The controller bus 202 may be in communication with the sensors 204, controllers 206, path projection component 104, and/or other components or systems to facilitate communication. As will be understood by one skilled in the art, additional or fewer components may be included in the automated driving/assistance system 102, without limitation.

The controller bus 202 may provide a communication medium for receiving and sending messages or data. In one embodiment, the controller bus 202 may include a processor and data storage for storing data and/or retrieving data. For example, the controller bus 202 may store messages or data published on the bus which can then be accessed or requested by another component in communication with the controller bus 202. In one embodiment, the controller bus 202 includes a CAN bus as described by an ADASIS specification.

The sensors 204 may include any sensors or data sources that can provide data used by the controllers 206 or path projection component 104. For example, one or more of a radar system 106, LIDAR system 108, camera system 110, GPS 112, ultrasound system 114, or data store 116 may publish data to the controller bus 202 for use by the controllers and/or the path projection component 104. In one embodiment, sensors 204 and controllers 206 may both provide data and consume data on the controller bus 202. For example, the sensors 204 may modify operation based on data on the bus 202 and provide sensed data based on the modified operation. Similarly, controllers 206 may provide data from sensors 204 or data resulting from calculations to the controller bus 202 for use by other components on the controller bus 202.

The path projection component 104 may determine and/or provide path attributes for a path to be traveled by a vehicle to the controller bus. The path projection component 104 may determine the path attributes based on map data 208 (e.g., from an electronic map or an attributed predicted path provider) and/or drive history data 210 (e.g., from a drive history specific to paths or locations already traveled by the driver and/or vehicle) so that aspects of the future roadway not yet detectable by the sensors 204 may be accounted for in advance. In one embodiment, the path attributes may include fused path attributes based on two or more different sources such as map data 208 and/or drive history data 210. The path attributes may correspond to a section of a future path that is immediately ahead of the vehicle and which may be used by the controllers 206 to perform driver assistance or automated driving tasks. The controllers 206 may include physical controllers and/or logical controllers that provide physical actuation or control signals for various aspects of a vehicle, such as of the vehicle control system 100 of FIG. 1. Example driver assistance or automated driving tasks performed by the controllers 206 may include, by way of example, driver notifications, drive train or suspension adjustments, speed adjustments, object or pedestrian detection, localization within a roadway, driving path generation for the current route (e.g., where on a roadway to position the vehicle), or the like.

According to one embodiment, the path projection component 104 combines or fuses drive history information with attributed predicted path data. In one embodiment, an attributed predicted path includes data from multiple sources, such as map-related data, as well as a communication method that presents the data in real-time for a short distance in front of the vehicle. The drive history may include data obtained from vehicle sensors over a period of time. If the vehicle driver is identified when driving the vehicle, the drive history data can be associated with a particular driver. The path projection component 104 combines the attributed predicted path data with the drive history data and presents a "fused" view of these data sets to the driver of the vehicle.

Figure 3:
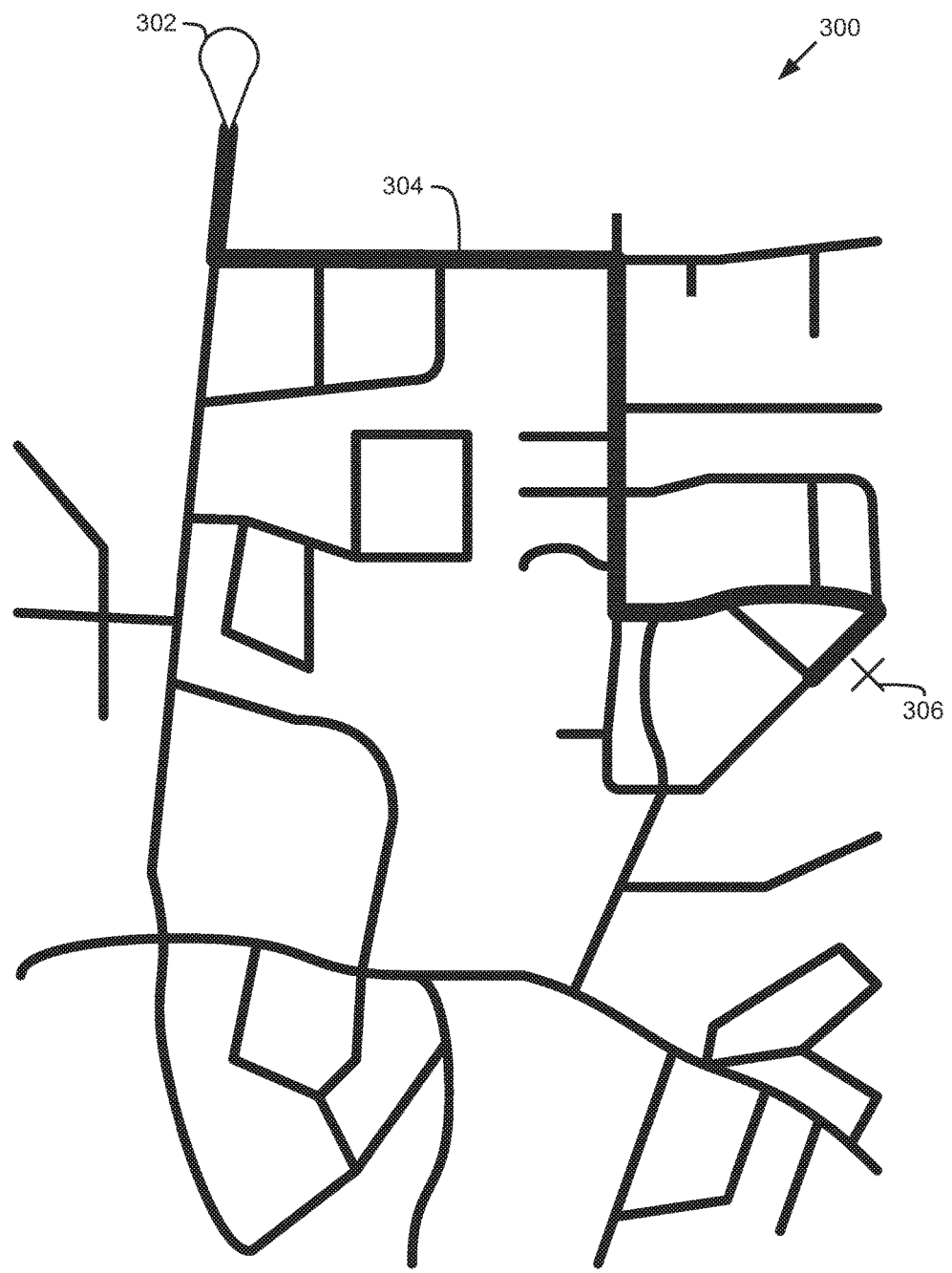
FIG. 3 illustrates a map of roadways near a current location of a vehicle, according to one implementation.

FIG. 3 illustrates a map 300 of roadways near a current location 302 of a vehicle. For example, the map 300 may illustrate roadways near the vehicle that are found in an electronic map accessible by the vehicle. The current location 302 of the vehicle may be obtained from a positioning system. For example, the vehicle may include a global navigation satellite system (GNSS) receiver, such as a Global Positioning System (GPS) receiver, Global Navigation Satellite System (GLONASS) receiver, Galilleo, or Beidou system mounted in the vehicle. Using the current location and/or any other available data, the path projection component 104 may determine or predict a destination and/or a most probable path for the vehicle. Example data that may be used to determine the most probable path include vehicle or human drive history, time of day, current location, passenger or driver identity, day of the week, information from a navigation system (such as a destination or current route), or the like. A most probable path 304 and probable destination 306 which may be identified by the path projection component 104 is shown on the map 300.

In one embodiment, the path projection component 104 may obtain path attributes from a drive history, electronic map, attributed predicted path provider, or any other source for at least a portion of the most probable path 304. For example, road geometry, speed limits, actual driving speeds of the vehicle or driver, previously detected obstacles or hazards, or the like may be determined and provided to a controller bus. In one embodiment, the path projection component 104 generates fused path attributes based on the path attributes from different sources. This data may be used by the controllers and/or related applications to prepare for the path ahead and/or perform functions or tasks that benefit from having predicted or anticipatory data. In one embodiment, only a portion of the most probable path 304 may be projected initially and additional path attributes may be provided for further sections as the vehicle travels along the most probable path 304.

Figure 4:
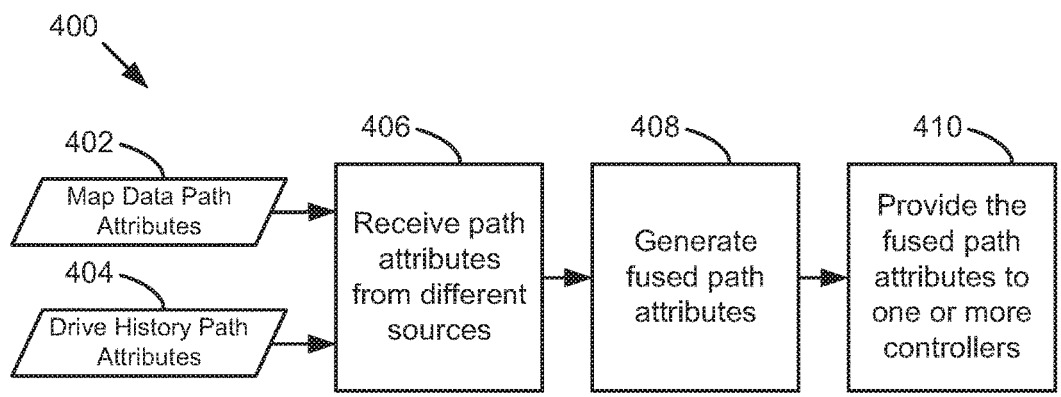
FIG. 4 is a schematic diagram illustrating a method for generating combined or fused path attributes, according to one implementation.

FIG. 4 is a schematic diagram illustrating a method 400 for generating combined or fused path attributes, according to one embodiment. The method 400 may be performed by a path projection component 104 and/or an automated driving/assistance system 102.

The method 400 begins and the path projection component 104 receives at 406 map data path attributes 402 and/or drive history path attributes 404. The map data path attributes 402 may be determined by the path projection component 104 and/or may be provided by an attributed predicted path provider. The drive history path attributes 404 may be determined by the path projection component 104 and/or may be provided by a drive history provider or data store. The path projection component 104 may convert the path attributes 402, 404 into a common format corresponding to a controller bus and any devices, systems, or controllers connected to the controller bus. In one embodiment, the common format may be common to the controller bus and/or all systems connected to the bus. Thus, only one version of data may need to be published to the controller bus and a plurality of message carrying the same or similar data for different controllers may not be needed.

The path projection component 104 may generate at 408 fused path attributes based on the map data path attributes 402 and/or drive history path attributes 404. In one embodiment, the path projection component 104 may generate at 408 the fused path attributes by including all of the drive history path attributes 404 for a section of roadway and filling in any gaps or details about the roadway with any map data path attributes 402. For example, the path projection component 104 may generate at 408 the fused path attributes by populating a matrix of map path attributes 402 with data from the drive history path attributes 404 and filling in holes or missing data from the map data path attributes 402. In one embodiment, the path projection component 104 may generate at 408 and/or may create new values for one or more attributes by creating an average or weighted average for a path attribute based on map data path attributes 402 and drive history path attributes 404 that correspond to the same attribute of a roadway.

The path projection component 104 provides at 410 the data to one or more controllers. In one embodiment, the path project component 104 publishes the data in the common format according to a common protocol. For example, the common protocol may correspond to a protocol used by the controller bus. The path projection component 104 may publish the data by sending a message that includes any path attributes and/or an identifier or tag indicating the type of data in the message. One or more controllers may receive a subset of the published data based on their subscriptions. For example, there may be different categories for data which may be published on the controller bus and some controllers may only need some subset of those data types. For example, each controller may provide a list of subscriptions to the controller bus and the controller bus may forward messages or data corresponding to the subscriptions, or may notify a controller that data corresponding to a subscription has been received. Thus, the controllers may receive only a subset of the data. Additionally, multiple controllers may receive the same data in the same format or protocol without requiring the path projection component 104 to send the data two or more times or in different formats. The controllers, after receiving the subset of data, may reconstruct the data for use in the task or application that uses that data.

By providing data using a common protocol significant reduction in resource usage and development time for an automated driving/assistance system 102 may be achieved. For example, previously, a special protocol would have to be created for each application in each controller. However, with the common protocol, those devices that are configured to communicate over the CAN bus may be able to receive the path attributes and only one message may need to be sent and the data may be accessible by any controller connected to the CAN bus. These benefits may be available for automated driving systems or driver assistance systems. For example, human driven vehicles may be able to provide details or warnings about a path ahead to a human driver or provide intelligent cruise control functionality. As another example, automated vehicles may benefit from rich sensor data and reduced messaging and processing requirements of embodiments disclosed herein.

Figure 5:
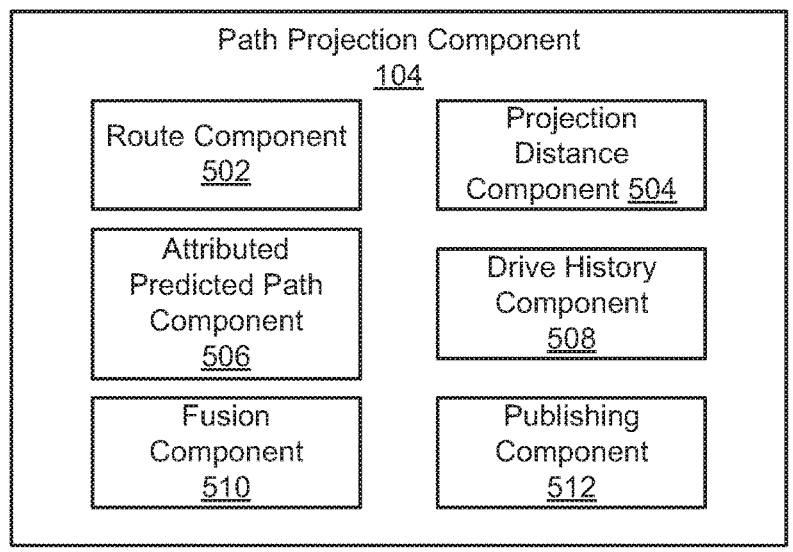
FIG. 5 is a schematic block diagram illustrating example components of a path projection component, according to one implementation.

FIG. 5 is a block diagram illustrating example components of a path projection component 104, according to one implementation. In the depicted embodiment, the path projection component 104 includes a route component 502, a projection distance component 504, an attributed predicted path component 506, a drive history component 508, a fusion component 510, and a publishing component 512. The components 502-512 are given by way of illustration only and may not all be included in all embodiments. In fact, some embodiments may include only one or any combination of two or more of the components 502-512. Furthermore, some of the components 502-512 may be located outside the path projection component 104, such as within an automated driving/assistance system 102, attributed predicted path provider, or drive history provider.

The route component 502 is configured to determine a route for a parent vehicle, such as a vehicle in which the path projection component 104 is located or installed. In one embodiment, the route component 502 may determine a most probable route or path for the vehicle based on available information. For example, the route component 502 may determine a likely destination and/or route based on the time of day, a drive history, a home location, a work location, a driver or passenger identity, or any other information. In one embodiment, the route component 502 may receive destination and/or route information from a navigation system. In one embodiment, the most probable route or path may match or vary slightly from the route or destination provided by the navigation system.

In one embodiment, the route component 502 may detect a variation from the predicted route (e.g., most probable route or path) and/or calculate or determine a new most probable path based on the variation. For example, if the predicted path is not correct and/or is not followed by the vehicle, the route component 502 may determine a new most probable route or path.

The projection distance component 504 is configured to determine a distance for which a path should be projected for the vehicle. In one embodiment, the distance is based upon a current speed or velocity of the vehicle. For example, the projection distance component 504 may select a larger projection distance if the vehicle is moving faster or has a route that extends along a route with a high speed limit. In one embodiment, the projection distance component 504 may determine a projection distance based on an amount of memory available to the path projection component 104. In one embodiment, the projection distance component 504 may determine a projection distance based on an amount of time it will take to travel a specific distance. For example, the projection distance may correspond to a distance it will take the vehicle to travel one minute, or any other time period, along a most probable path or route selected or identified by the route component 502.

The attributed predicted path component 506 is configured to determine map path attributes based on an electronic map. In one embodiment, the attributed predicted path component 506 determines the map path attributes by retrieving data about a roadway from an electronic map. For example, the attributed predicted path component 506 may retrieve details about road geometry, tilt, slope, curvature, or the like from an electronic map for a region between a current location of the vehicle and a location at a projection distance away from the vehicle. In one embodiment, the attributed predicted path component 506 receives the map path attributes or attributed predicted path attributes from an attributed predicted path provider separate or external from the path projection component 104. For example, the attributed predicted path component 506 may provide information about a region for which path attributes are needed to an attributed predicted path provider and receive the map path attributes from the attributed predicted path provider. In one embodiment, the attributed predicted path component 506 may pull path attributes from other sources such as real-time traffic information, weather information, construction information, or the like.

The drive history component 508 is configured to determine drive history path attributes based on a drive history. For example, the drive history may include data stored in a data store corresponding to roadways, routes, or paths previously traveled by the vehicle and/or a driver or passenger of the vehicles. In one embodiment, the drive history component 508 determines the drive history path attributes by retrieving data about a roadway from a drive history. For example, the attributed predicted path component 506 may retrieve details about road geometry, tilt, slope, curvature, hazards, or the like from a drive history for a region between a current location of the vehicle and a location at a projection distance away from the vehicle. In one embodiment, the information from a drive history may be more accurate and/or detailed than information provided by an attributed predicted path or electronic map because the data may correspond to data actually gathered and/or experienced by sensors of the vehicle. In one embodiment, the drive history component 508 receives the drive history attributes from drive history provider separate or external from the path projection component 104. For example, the drive history component 508 may provide information about a region for which path attributes are needed to a drive history provider and receive the drive history path attributes from the drive history provider. In one embodiment, the drive history includes information, including sensor information, gathered during actual travel of the specific vehicle and/or driver over a specific path or roadway. For example, the drive history may reflect actual sensory or driving experience of the vehicle or driver and not data from other sources such as other vehicles, map providers, or the like.

The fusion component 510 is configured to determine one or more fused or combined path attributes for a projected path. In one embodiment, the fusion component 510 determines the path attributes based on drive history path attributes provided by the drive history component 508 and/or map path attributes provided by the attributed predicted path component 506. At times, there may be no drive history for a current location or a predicted path of the vehicle and only attributed predicted path or map path attributes are available. The fusion component 510 may generate fused path attributes that include or are based on information from both the attributed predicted path component 506 and the drive history component 508. In one embodiment, the fusion component 510 generates fused data by including all data from the drive history and using the data from the attributed predicted path to fill in any holes or provide additional path attributes not addressed by the drive history. For example, the fusion component 510 may prefer data from the drive history and only use map data, or other attributed predicted path data, when the map or other data does not contradict or duplicate the drive history data. In one embodiment, averages for one or more fused path attributes may be generated by creating a weighted or unweighted sum of one or more drive history path attributes and one or more path attributes obtained or generated by the attributed predicted path component 506.

In one embodiment, the fusion component 510 may select or determine data for a distance corresponding to a projection distance ahead of the vehicle's current location. As the vehicle travels the roadway, the fusion component 510 may gather or determine additional path attributes to maintain or provide path attributes for the projection distance ahead of the vehicle. For example, as the vehicle proceeds along a route additional path attributes for subsequent sections of roadway may be determined. In one embodiment, if a change in path is detected by the route component 502, the fusion component 510 may determine attributes for a new predicted or most probable route or path.

In one embodiment, the path attributes may also include path attributes for stubs, or possible side routes for the vehicle. For example, the path attributes may include path attributes not only along the most probable route or path identified by the route component 502, but also path attributes for any roadways that intersect with the most probable route. This may provide sufficient information for a short distance until an alternate route can be calculated and additional path attributes or data can be obtained.

In one embodiment, the fusion component 510 converts the path attributes into a common format. For example, the fusion component 510 may convert path attributes from different sources, such as from the attributed predicted path component 506 and/or the drive history component 508 into a common format that can be interpreted or used by all of the controllers on a controller bus. Thus, all controllers may be able to use the information obtained by the fusion component 510.

The publishing component 512 is configured to provide path attributes (such as fused path attributes generated by the fusion component 510) to a plurality of controllers. In one embodiment, the publishing component 512 provides the path attributes to the controllers using a controller bus, such as a CAN bus. The publish component 512 may send one or more messages that publish path attributes for a section of the road ahead of the vehicle to the controller bus. The messages may be sent according to a common protocol so that controllers that need the same data can access the same message. For example, each controller does not require its own specific message in order to obtain needed path attributes. Rather this data is published to the controller bus and those controllers that need the data can access, receive, and/or retrieve that data. The common protocol may specify message types, data types, message formats, and/or data formats so that the data is communicated in a standardized manner than can be utilized by any controller on the bus.

In one embodiment, one or more controllers on the bus may only end up receiving and/or using a subset of all the fused path attributes placed on the controller bus. For example, controller that suggests a speed to a human driver may not need every type of path attribute in order to determine and/or suggest a speed. In one embodiment, a controller may subscribe to a subset of data or certain types of path attributes, such as those relating to speed limits of the roadway and/or previous speeds driven by a current human driver while on the roadway. For example, the controller may provide a subscription list that indicates the types of path attributes that the controller would like to receive when that data is published to the bus. The controller bus may store and manage a subscription list that indicates which controllers are subscribed to which types of messages or data. In response to receiving messages publishing path attributes to the controller bus, the controller bus may compare the message type or data type to a subscription list and provide the message to the subscribed controllers. Thus, controllers may not need to process or receive every message on the controller bus and may simply use the data they need for reconstruction and/or use for the applications of the controller.

In one embodiment, the publishing component 512 may continue to publish additional (fused or unfused) path attributes as the vehicle traverses a route and/or when the route changes. For example, if the route component 502 detects a departure from a predicted route, the publishing component 512 may obtain path attributes for a new route or path from the fusion component 510 and publish those path attributes for the new route or path to the controller bus. Additionally, if the route changes, the publishing component 512 may send messages on the controller bus to indicate that previously sent data is or is not outdated and/or should be discarded. The controller bus may then discard the outdated or unneeded data and/or notify controllers of the change. The controllers may then be able to utilize data for the new route or path for their respective applications.

According to one embodiment, by providing fused path attributes that combine data from multiple sources, a reduced amount of load is placed on controllers that are processing, interpreting, or otherwise using the path attributes to perform vehicle control or driver assistance tasks.

Figure 6:
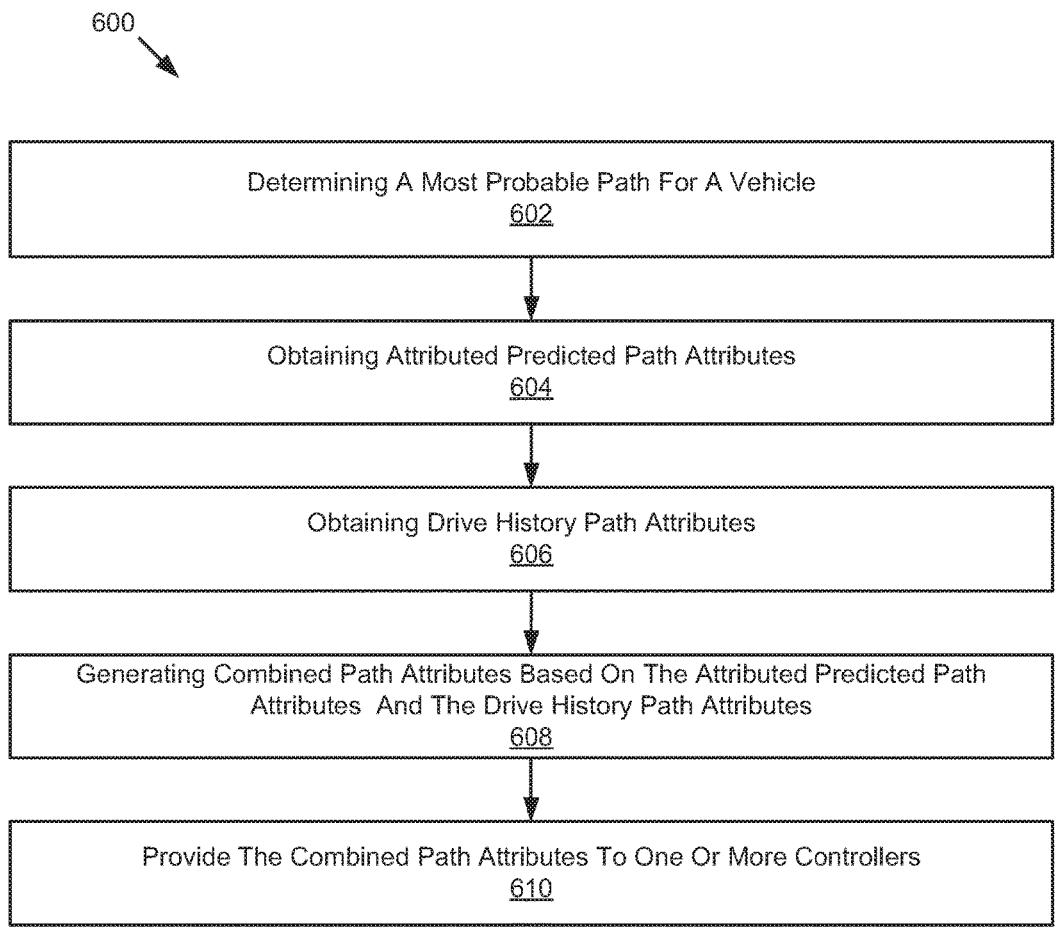
FIG. 6 is a schematic flow chart diagram illustrating a method for publishing path attributes to one or more controllers, according to one implementation.

Referring now to FIG. 6, a schematic flow chart diagram of a method 600 for generating combined path attributes is illustrated. The method 600 may be performed by a path projection component or an automated driving/assistance system, such as the path projection component 104 of FIG. 1, 2, or 5 or the automated driving/assistance system 102 of FIG. 1 or 2.

The method 600 begins and a route component 502 determines at 602 a most probable path for a vehicle. An attributed predicted path component 506 obtains at 604 attributed predicted path attributes based on a map, such as an electronic map. The attributed predicted path attributes may also include information from other sources such as real-time weather, traffic, or other sources. A drive history component 508 obtains at 606 drive history path attributes based on a drive history. A fusion component 510 generates at 608 combined path attributes based on the path attributes from the attributed predicted path and the path attributes from the drive history. For example, the combined path attributes may include fused path attributes that have determined or calculated based on data from both a drive history and an attributed predicted path provider (such as map data). A publishing component 512 provides at 610 the combined path attributes to one or more controllers.

EXAMPLES

The following examples pertain to further embodiments.

Example 1 is a method that includes determining a most probable path for a vehicle. The method also includes obtaining attributed predicted path attributes based on a map and obtaining drive history path attributes based on a drive history. The method further includes generating combined path attributes based on the path attributes from the attributed predicted path and the path attributes from the drive history. The method also includes providing the combined path attributes to one or more controllers.

In Example 2, providing the combined path attributes to the one or more controllers in Example 1 includes providing the combined path attributes over a CAN bus.

In Example 3, generating the combined path attributes in any of Examples 1-2 includes generating path attributes comprising the drive history path attributes and a portion of attributed predicted path attributes corresponding to path attributes not defined by the drive history path attributes.

In Example 4, the attributed predicted path attributes and the drive history path attributes in any of Examples 1-3 include parameters for a same path attribute, and wherein generating the combined path attributes comprises generating a combined path attribute for the same path attribute based on weighted values of one or more attributed predicted path attributes and drive history path attributes.

In Example 5, determining the most probable path for the vehicle in any of Examples 1-4 includes determining based on the drive history.

In Example 6, the plurality of controllers in any of Examples 1-6 include one or more of an adaptive cruise control, an energy management controller, a curve warning controller, a headlight controller, a lane departure warning system, a hill power train optimization controller, a driver notification system, an automated driving system, and a driver assistance system.

In Example 7, the method in any of Examples 1-6 further include determining a projection distance along the most probable path, wherein the combined path attributes correspond to a portion of the most probable path extending from a location of the vehicle corresponding to a distance corresponding to the projection distance.

Example 8 is a system that includes a plurality of controllers, a route component, an attributed predicted path component, a drive history component, a fusion component, and a publishing component. The route component is configured to determine a most probable path for a vehicle. The attributed predicted path component is configured to obtain attributed predicted path attributes based on a map. The drive history component is configured to obtain drive history path attributes based on a drive history. The fusion component is configured to generate combined path attributes based on the attributed predicted path attributes and the drive history path attributes. The publishing component is configured to provide the combined path attributes to one or more controllers.

In Example 9, the publishing component in Example 8 is configured to provide the combined path attributes to the one or more controllers over a CAN bus.

In Example 10, the fusion component in any of Examples 8-10 is configured to generate combined path attributes comprising the drive history path attributes and a portion of the attributed predicted path attributes corresponding to path attributes not defined by the drive history path attributes.

In Example 11, the attributed predicted path attributes and the drive history path attributes in any of Examples 8-10 include parameters for a common path attribute, and wherein the fusion component is configured to generate a combined path attribute for the common path attribute based on weighted values of one or more attributed predicted path attributes and drive history path attributes.

In Example 12, the route component in any of Examples 8-11 is configured to determine the most probable path for the vehicle based on the drive history.

In Example 13, the plurality of controllers in any of Examples 8-12 include one or more of an adaptive cruise control, an energy management controller, a curve warning controller, a headlight controller, a lane departure warning system, a hill power train optimization controller, a driver notification system, an automated driving system, and a driver assistance system.

In Example 14, the system in any of Examples 8-13 further includes a projection distance component configured to determine a projection distance along the most probable path, wherein the combined path attributes correspond to a portion of the most probable path extending from a location of the vehicle corresponding to a distance corresponding to the projection distance.

Example 15 is computer readable storage media storing instructions that, when executed by one or more processors, cause the processors to determine a most probable path for a vehicle, obtain attributed predicted path attributes based on a map, and obtain drive history path attributes based on a drive history. The instructions further cause the one or more processors to generate combined path attributes based on the path attributes from the attributed predicted and the path attributes from the drive history. The instructions further cause the one or more processors to provide the combined path attributes to one or more controllers.

In Example 16, providing the combined path attributes to the one or more controllers in Example 15 includes providing the combined path attributes over a CAN bus.

In Example 17, generating the combined path attributes in any of Examples 15-16 includes generating path attributes comprising the drive history path attributes and a portion of attributed predicted path attributes corresponding to path attributes not defined by the drive history path attributes.

In Example 18, the attributed predicted path attributes and the drive history path attributes in any of Examples 15-17 include parameters for a same path attribute, and wherein generating the combined path attributes comprises generating a combined path attribute for the same path attribute based on weighted values of one or more attributed predicted path attributes and drive history path attributes.

In Example 19, determining the most probable path for the vehicle in any of Examples 15-18 includes determining based on the drive history.

In Example 20, the plurality of controllers in any of Examples 15-19 include one or more of an adaptive cruise control, an energy management controller, a curve warning controller, a headlight controller, a lane departure warning system, a hill power train optimization controller, a driver notification system, an automated driving system, and a driver assistance system.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
    obtaining attributed predicted path attributes for a path of a vehicle from a provider based on a map;
    obtaining drive history path attributes for the path of the vehicle based on a drive history;
    fusing the attributed predicted path attributes and the drive history path attributes to generate combined path attributes, wherein the fusing comprises populating a matrix comprising details of the path of the vehicle by:
        first populating the matrix with the drive history path attributes; and
        populating unknown details in the matrix with the attributed predicted path attributes; and
    providing the combined path attributes to one or more controllers of the vehicle.

2. The method of claim 1, wherein providing the combined path attributes to the one or more controllers comprises providing the combined path attributes over a controller area network (CAN) bus.

3. The method of claim 1, further comprising determining a distance on the path of vehicle to project the combined path attributes, wherein the distance is determined based on a current speed of the vehicle or a current speed limit for a roadway on the path.

4. The method of claim 1, wherein the attributed predicted path attributes and the drive history path attributes comprise parameters for a same path attribute, and wherein fusing the attributed predicted path attributes and the drive history path attributes comprises generating a combined path attribute for the same path attribute based on weighted values of one or more attributed predicted path attributes and drive history path attributes.

5. The method of claim 1, further comprising determining the path of the vehicle based on the drive history.

6. The method of claim 1, wherein the one or more controllers comprise one or more of an adaptive cruise control, an energy management controller, a curve warning controller, a headlight controller, a lane departure warning system, a hill power train optimization controller, a driver notification system, an automated driving system, and a driver assistance system.

7. The method of claim 1, further comprising determining a projection distance along the path of the vehicle, wherein the combined path attributes correspond to a portion of the path of the vehicle extending from a location of the vehicle corresponding to a distance corresponding to the projection distance.

8. A system comprising:
    a plurality of controllers of a vehicle;
    an attributed predicted path component configured to obtain attributed predicted path attributes for a path of the vehicle from a provider based on a map;
    a drive history component configured to obtain drive history path attributes for the path of the vehicle based on a drive history;
    a fusion component configured to fuse the attributed predicted path attributes and the drive history path attributes to generate combined path attributes by populating a matrix comprising details of the path of the vehicle by:
        first populating the matrix with the drive history path attributes; and
        populating unknown details in the matrix with the attributed predicted path attributes; and
    a publishing component configured to provide the combined path attributes to one or more of the plurality of controllers of the vehicle.

9. The system of claim 8, wherein the publishing component is configured to provide the combined path attributes to the one or more controllers over a controller area network (CAN) bus.

10. The system of claim 8, further comprising a route component configured to determine a distance on the path of the vehicle to project the combined path attributes, wherein the distance is determined based on a current speed of the vehicle or a current speed limit for a roadway on the path.

11. The system of claim 8, wherein the attributed predicted path attributes and the drive history path attributes comprise parameters for a common path attribute, and wherein the fusion component is configured to generate a combined path attribute for the common path attribute based on weighted values of one or more attributed predicted path attributes and drive history path attributes.

12. The system of claim 8, further comprising a route component configured to determine the path of the vehicle based on the drive history of the vehicle.

13. The system of claim 8, wherein the plurality of controllers comprise one or more of an adaptive cruise control, an energy management controller, a curve warning controller, a headlight controller, a lane departure warning system, a hill power train optimization controller, a driver notification system, an automated driving system, and a driver assistance system.

14. The system of claim 8, further comprising a projection distance component configured to determine a projection distance along the path of the vehicle, wherein the combined path attributes correspond to a portion of the path of the vehicle extending from a location of the vehicle corresponding to a distance corresponding to the projection distance.

15. Non-transitory computer readable storage media storing instructions that, when executed by one or more processors, cause the one or more processors to:
   obtain attributed predicted path attributes for a path of a vehicle from a provider based on a map;
   obtain drive history path attributes for the path of the vehicle based on a drive history;
   fuse the attributed predicted path attributes and the drive history path attributes to generate combined path attributes by populating a matrix comprising details of the path of the vehicle by;
      first populating the matrix with the drive history path attributes; and
      populating unknown details in the matrix with the attributed predicted path attributes; and
   provide the combined path attributes to one or more controllers of the vehicle.

16. The non-transitory computer readable storage media of claim 15, wherein the instructions cause the one or more processors to provide the combined path attributes to the one or more controllers by providing the combined path attributes over a controller area network (CAN) bus.

17. The non-transitory computer readable storage media of claim 15, wherein the instructions further cause the one or more processors to determine a distance on the path of the vehicle to project the combined path attributes, wherein the distance is determined based on a current speed of the vehicle or a current speed limit for a roadway on the path.

18. The non-transitory computer readable storage media of claim 15, wherein the attributed predicted path attributes and the drive history path attributes comprise parameters for a same path attribute, and wherein the instructions cause the one or more processors to fuse the attributed predicted path attributes and the drive history path attributes by generating a combined path attribute for the same path attribute based on weighted values of one or more attributed predicted path attributes and drive history path attributes.

19. The non-transitory computer readable storage media of claim 15, wherein the instructions further cause the one or more processors to determine the path of the vehicle based on the drive history.

20. The non-transitory computer readable storage media of claim 15, wherein the one or more controllers of the vehicle comprise one or more of an adaptive cruise control, an energy management controller, a curve warning controller, a headlight controller, a lane departure warning system, a hill power train optimization controller, a driver notification system, an automated driving system, and a driver assistance system.

* * * * *